June 13, 1967  A. S. WILSEY  3,324,550

PLASTIC FOOD PRODUCT FEEDBACK MECHANISM

Filed Dec. 3, 1965  2 Sheets-Sheet 1

INVENTOR.
ALFRED S. WILSEY
BY Bair, Freeman
& Molinare
ATTORNEY

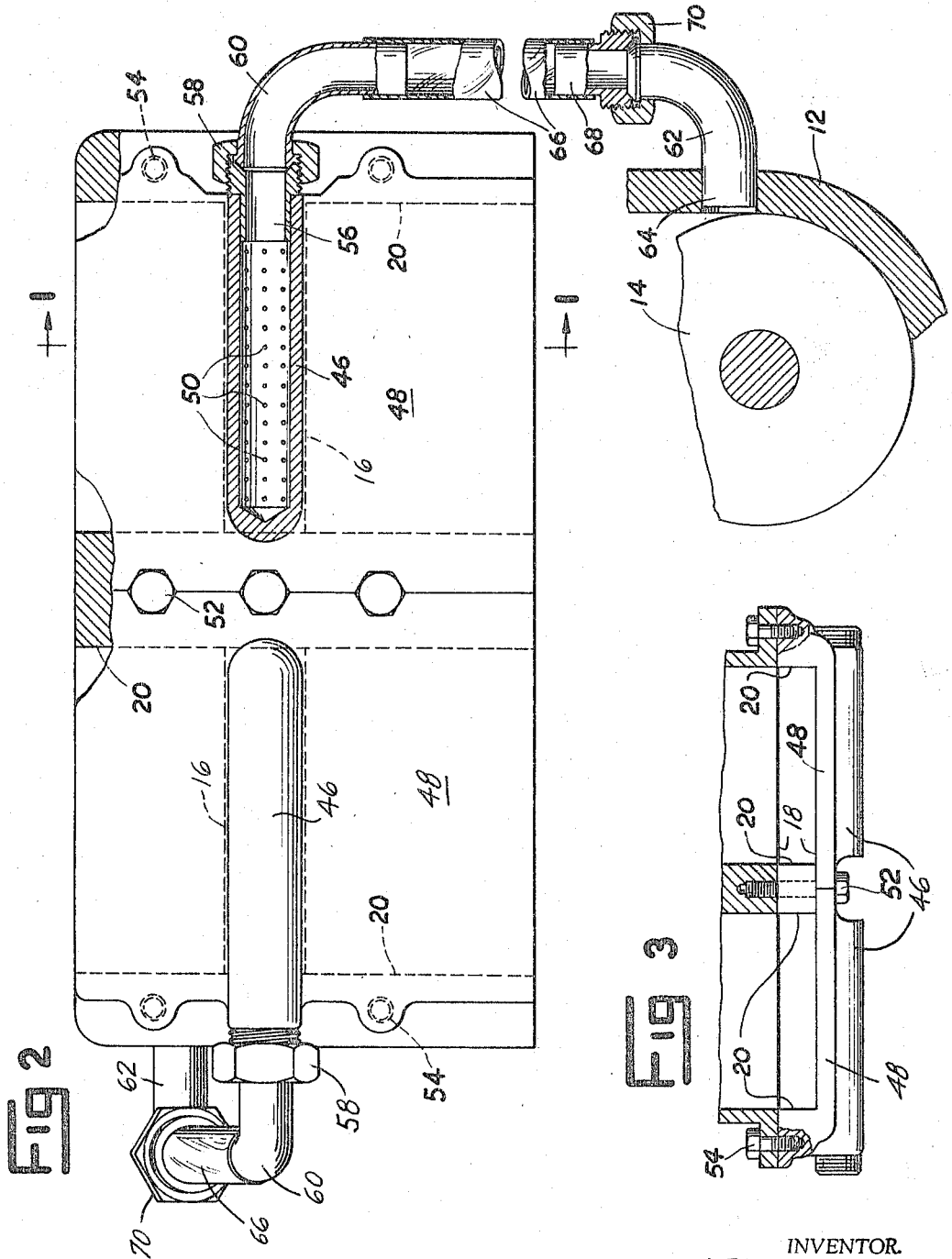

United States Patent Office 3,324,550
Patented June 13, 1967

3,324,550
PLASTIC FOOD PRODUCT FEEDBACK
MECHANISM
Alfred S. Wilsey, San Francisco, Calif., assignor to Wilsey, Bennett Co., San Francisco, Calif., a corporation of California
Filed Dec. 3, 1965, Ser. No. 511,436
5 Claims. (Cl. 31—8)

This invention relates to a product feedback mechanism for a product printing machine such as a butter or oleomargarine printing machine.

One object of the invention is to provide mechanism which feeds product back from a mold cavity to a feed auger or the like leading to a product discharge nozzle, the mechanism having means for releasing air from a mold cavity as product is fed thereto and comprising an air-receiving manifold which in addition to releasing air from the mold cavity as the feed auger discharges product thereinto will receive any excess product over and above the air released and return it automatically to the feed auger without attention by the operator of the machine.

In this connection prior patents such as Nos. 2,484,005, 2,592,793, 2,691,218 and 2,694,256 show air release valves for a mold cavity of a butter or oleomargarine printing machine designed to release the air from the mold cavity as product is forced into the mold cavity by a feed auger. In order to be sure that all the air is released, sometimes product is also forced through these valves and must be manually collected and returned to the product hopper of the printing machine. To eliminate any down time during operation of the machine and the time of the operator required for such return of product to the hopper, I have provided an automatic product feedback mechanism which, in addition to permitting the release of air from the mold cavity, causes any product carried along with the air to flow back into the feed auger section of the machine.

Another object of my present invention is to provide means for releasing air from the mold cavity of a product printing machine in the form of an air-receiving manifold on the mold cavity which has a plurality of perforations opposite the product discharge nozzle that delivers product to the mold cavity, such perforations communicating the interior of the mold cavity with the manifold.

A further object is to provide a conduit leading from the manifold to the feed auger of the machine and discharging thereinto whereby any product passing through the perforations and entering the manifold is fed back to the product being advanced toward the product discharge nozzle and the mold cavity.

A further object is to provide a product feedback mechanism wherein a cover plate for the mold cavity has the manifold incorporated therein and is thereby a combined cover plate and manifold.

Still a further object is to provide these combined cover plates and manifolds in pairs for that type of machine having two feed augers and two mold cavities with conduits leading from each manifold along the sides of the machine and into the feed augers of the machine which are also of dual character.

With these and other objects in view, my invention consists in the construction, arrangement and combination of the various parts of my product feed back mechanism, whereby the objects above contemplated are attained, as hereinafter more fully set forth, pointed out in my claims and illustrated in detail on the accompanying drawing, wherein:

FIG. 2 is an enlarged front elevation of the combined cover plates and manifolds I provide for the machine looking in the direction of the arrow 2 adjacent FIG. 1, FIG. 1 being a reduced scale sectional view on the line 1—1 of FIG. 2, and FIG. 3 is a part plan-part sectional view of the combined cover plates and manifolds and adjacent portions of the machine.

Figure 1:
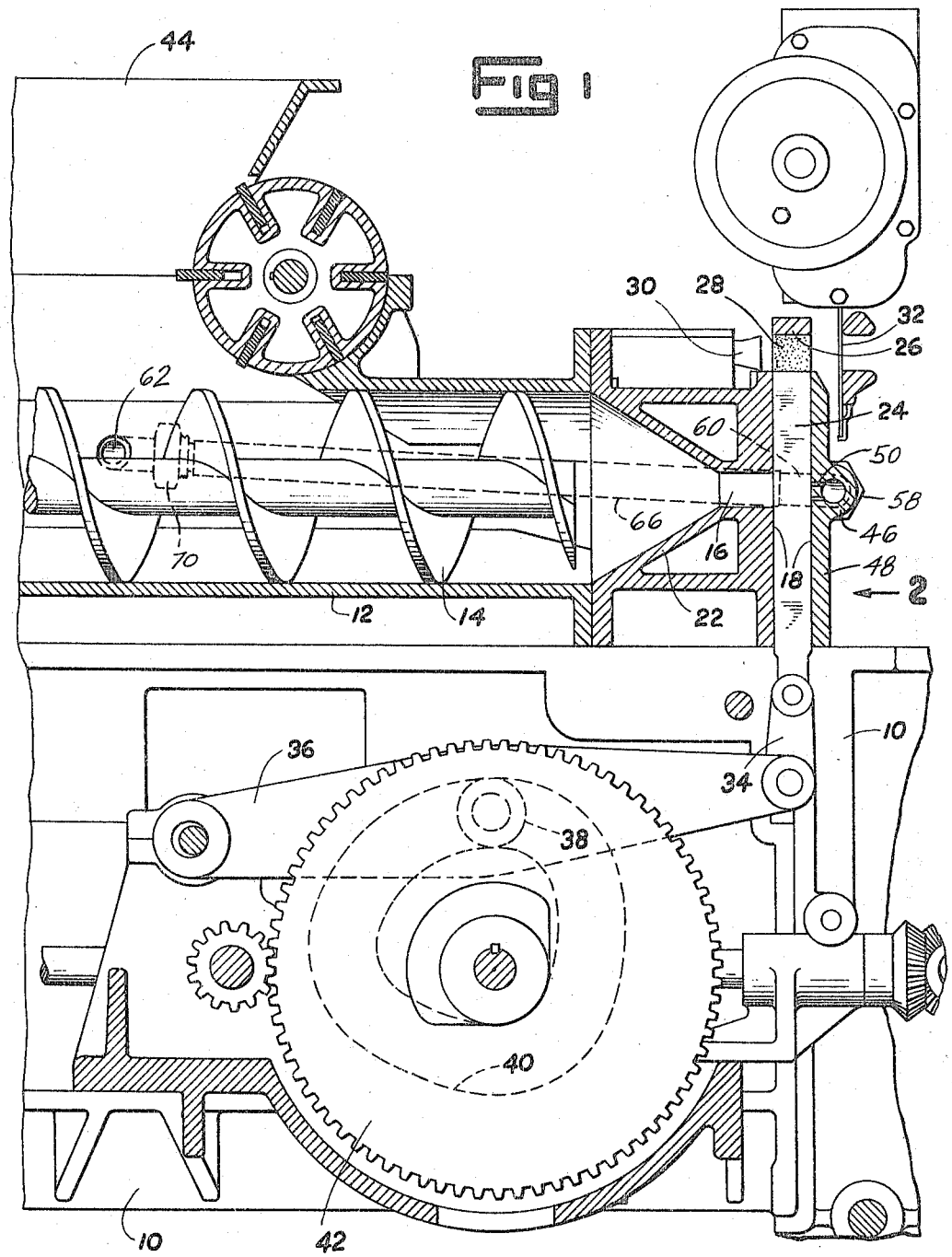
FIG. 1 is a vertical sectional view through a product printing machine of the type shown in the four patents above referred to and illustrates my automatic product feedback mechanism applied thereto.

On the accompanying drawings I have used the reference numeral 10 to indicate, in general, the frame of a product printing machine for the printing of butter, oleomargarine or the like. A machine of this character has a pair of auger tubes 12 in which feed augers 14 are rotatable. In FIG. 2 the auger for the right hand half of the machine is illustrated whereas the auger for the left hand half is omitted. The auger illustrated is out of position veritcally with respect to certain cover plates 48 to be later described merely by way of illustration to facilitate the showing of conduit means as will hereinafter appear.

The auger tube 12 has a discharge nozzle 16 discharging into a mold cavity, the front and back of which are shown at 18 in FIG. 1 and the sides of which are shown at 20 (two cavities) in FIG. 2. A cone 22 leads from each auger tube 12 to each discharge nozzle 16 as shown in FIG. 1.

In order to form a print of butter or the like, a vertically reciprocable plunger 24 and an extension 26 thereof provide the space for a molded print of butter 28 which is formed opposite the discharge nozzle 26 when the plunger is lowered to a position with the upper surface of the plunger and the lower surface of the extension substantially coincident with the lower and upper walls respectively of the discharge nozzle 16. The plunger and extension are then elevated to the position shown in FIG. 1 where the print 28 can be pushed by a second plunger 30 against wrapping paper 32 and through suitable dies for wrapping and packaging of the print of butter as disclosed in the prior patents referred to.

After the print 28 has been discharged from the plunger 24, 26, the plunger and extension are lowered by suitable mechanism such as a link 34 connecting the lower end of the plunger to a lever 36 which has a roller 38 coacting with a cam 40 of a gear 42 to impart vertical reciprocations to the plunger 24 as disclosed in the prior patents. When the space between the upper end of the plunger 24 and the lower surface of the extension 26 is opposite the discharge nozzle 16, the rotating auger 14 will push product received from a supply hopper 44 into the mold cavity 18, 20 and specifically that portion thereof bounded by the two surfaces mentioned. The air that is present therein must be disposed of to avoid air pockets in the print 28 and thereby short weight, and this is accomplished in my disclosure by the provision of a manifold 46 formed as part of a cover plate 48 for the mold cavity 18, 20. Thus the parts 46 and 48 form a combined cover plate and manifold. The interior of the mold cavity is communicated to the interior of the manifold 46 by means of a series of perforations 50, a suggested pattern for which is shown in the right half of FIG. 2.

FIGS. 2 and 3 show how two of the cover plates 48 are provided to form a pair of mold cavities and how they are secured to the printing machine by means of cap screws 52 and 54, the split between the two cover plates being on the center line of the cap screws 52 as shown in FIG. 2.

The manifold 46 has a nipple 56 pressed or welded therein with which a coupling nut 58 is associated as shown in FIG. 2 for the purpose of hydraulically connecting an elbow 60 to the manifold. A second elbow 62 is pressed or welded into a hole 64 drilled in the side of the auger tube 12 and the two are connected together by a hose 66 of Tygon or other suitable plastic material which is preferably transparent so that the feedback flow of product therethrough may be observed by the machine operator. The outer end of the elbow 60 is inserted into one end of the hose 66 whereas the other end has a nipple 68 inserted thereinto and connected by a coupling nut 70 to the elbow 62.

*Practical operation*

In the operation of my feedback mechanism, the perforations 50 permit the flow of air displaced from the mold cavity as the product is fed through the nozzle 16 thereinto (the plunger 24, 26 being in the lowered position at this time), and when the cavity is completely filled with product, the timing of the machine is such that the plunger starts on its upward stroke.

The stroke of the plunger and the speed of rotation of the auger 14 must be nicely balanced in order to eliminate all air but prevent outflow of product through the perforations 50 and this balance is almost impossible to obtain. Even when obtained, any change in the consistency of the product will result in under-elimination or over-elimination of the air. Therefore, it is necessary to over-eliminate to make sure that under-elimination is not experienced and consequently the forming of the print 28 with air in it, the print being accordingly underweight. Therefore, some product must be expelled through the perforations 50 to make sure that all of the air is expelled.

In the previous patents where air elimination valves were used, it was necessary to manually collect the product resulting from over-elimination of the air and return it to the hopper 44. In my disclosure, however, it is obvious that any product entering the manifold 46 will be propelled along the elbow 60 and the hose 66 into the elbow 62 and from there discharged into the auger tube 12 along with the air which finds its way upwardly through the product to atmosphere. Thus, I have provided for automatic return of the excess product to the auger tube 12 where it can again be advanced by rotation of the auger 14, through the nozzle 16, to the mold cavity in a subsequent cycle of operation of the machine.

From the foregoing specification it will be obvious that I have provided a relatively simple product feedback mechanism which operates automatically and without attention other than periodic cleaning as required for the entire machine after a time period.

Some changes may be made in the construction and arrangement of the parts of my product feedback mechanism without departing from the real spirit and purpose of my invention, and it is my invention to cover by my claims any modified forms of structure or use of mechanical equivalents which may reasonably be included within their scope.

I claim as my invention:

1. In a product and air feedback mechanism for a plastic food product printing machine of the type having means forming a mold cavity, a product plunger reciprocable in said mold cavity and means having a product discharge nozzle to feed product to said mold cavity, means for releasing air from said mold cavity as product is fed thereto comprising an air receiving manifold on said means forming a mold cavity, said last mentioned means having a plurality of spaced perforations opposite said product discharge nozzle which communicate the interior of said mold cavity with said manifold, and a conduit leading from said manifold to said means to feed product to said mold cavity and discharging thereinto whereby any product or air discharge passing through said perforations and entering said manifold is fed back to the product being advanced toward said product discharge nozzle.

2. A product feedback mechanism according to claim 1 wherein a cover plate for said mold cavity has said manifold incorporated therein and is thereby a combined cover plate and manifold.

3. A product feedback mechanism according to claim 2 wherein there are a pair of said mold cavities and a combined cover plate and manifold is provided for each, the discharge ends of said manifolds being on opposite sides of the product printing machine and there is a conduit leading from each manifold along the respective sides of the machine and through said sides into said means to feed product to said mold cavity.

4. A product feedback mechanism according to claim 1 wherein said conduit is transparent to permit observance of the flow of product therethrough.

5. A product feedback mechanism according to claim 1 wherein elbows are provided at each end of said conduit and have disconnectible coupling means with said manifold and the discharge end of said conduit.

References Cited

UNITED STATES PATENTS

| | | | |
|---|---|---|---|
| 1,505,800 | 8/1924 | Peavey | 107—15 |
| 2,375,693 | 5/1945 | Russell et al. | 31—8 |
| 2,471,702 | 5/1949 | Rapp et al. | 31—8 |
| 2,471,703 | 5/1949 | Rapp et al. | 31—8 |
| 2,484,005 | 10/1949 | Alberti | 31—8 |
| 2,666,229 | 1/1954 | Vogt | 18—21 |
| 3,120,703 | 2/1964 | Bell | 31—8 |
| 3,137,029 | 6/1964 | De Zolt | 17—32 |

FOREIGN PATENTS 48,163   12/1933   Denmark.

SAMUEL KOREN, *Primary Examiner.*

ALDRICH F. MEDBERY, *Examiner.*